United States Patent
Oosawa

(10) Patent No.: US 6,720,772 B2
(45) Date of Patent: Apr. 13, 2004

(54) DATA HOLDING DEVICE OF AN INTERNAL COMBUSTION ENGINE

(75) Inventor: Toshio Oosawa, Hyogo (JP)

(73) Assignee: Mitsubishi Denko Kabushiki Kaisha, Tokyo (JP)

( * ) Notice: Subject to any disclaimer, the term of this patent is extended or adjusted under 35 U.S.C. 154(b) by 13 days.

(21) Appl. No.: 10/197,400

(22) Filed: Jul. 18, 2002

(65) Prior Publication Data

US 2003/0146754 A1 Aug. 7, 2003

(30) Foreign Application Priority Data

Feb. 1, 2002 (JP) ......................................... 2002-025169

(51) Int. Cl.⁷ ............................................... F02P 17/00
(52) U.S. Cl. ...................... 324/378; 324/380; 701/101
(58) Field of Search ............................ 324/378, 380, 324/387, 76.61, 76.66, 111, 112, 113; 73/35.01, 35.03; 123/146.5, 406.26, 406.27, 406.28; 701/101, 102

(56) References Cited

U.S. PATENT DOCUMENTS

| | | | |
|---|---|---|---|
| 4,541,386 A | * 9/1985 | Kishi et al. .................. 123/479 |
| 4,546,647 A | * 10/1985 | Takahashi .................. 73/118.1 |
| 4,572,143 A | * 2/1986 | Umesaki et al. ............ 123/479 |
| 5,461,569 A | * 10/1995 | Hara et al. .................. 701/101 |

FOREIGN PATENT DOCUMENTS

| | | | | |
|---|---|---|---|---|
| GB | 2255422 A | * 11/1992 | ........... F02D/41/26 |
| JP | 58-26648 | 2/1983 | |
| JP | 61-32173 | 7/1986 | |
| JP | 04 209949 A | 7/1992 | |
| JP | 08 021296 A | 1/1996 | |
| JP | 2001-349239 A | 12/2001 | |

* cited by examiner

Primary Examiner—Andrew H. Hirshfeld
Assistant Examiner—Minh Chau
(74) Attorney, Agent, or Firm—Sughrue Mion, PLLC

(57) ABSTRACT

The data holding device includes a switch adapted to be turned on and off in accordance with a state of the engine, a control element in the form of a CPU for determining the presence or absence of abnormality in the engine based on a state of the switch, a data storage element in the form of an EEPROM for storing recognized data corresponding to the presence or absence of abnormality, an external power supply for supplying a power supply voltage to the CPU, and a voltage holding circuit for holding the power supply voltage at a prescribed value. When abnormality is found in the engine, plural pieces of recognized data indicative of abnormality are stored into the EEPROM, and the engine state is determined based on groups of recognized data stored in the EEPROM.

3 Claims, 5 Drawing Sheets

DATA HOLDING DEVICE OF AN INTERNAL COMBUSTION ENGINE

This application is based on Application No. 2002-025169, filed in Japan on Feb. 1, 2002, the contents of which are hereby incorporated by reference.

BACKGROUND OF THE INVENTION

1. Field of the Invention

The present invention relates to a data holding device which stores the state of an internal combustion engine installed on a vehicle or the like.

2. Description of the Prior Art

FIG. 4 is a block diagram which shows a known data holding device 1A of an internal combustion engine. FIG. 5 is a flow chart which shows the operation of the known data holding device 1A of an internal combustion engine.

In FIG. 4, the data holding device 1A includes a CPU 11A and an EEPROM 12. A switch 2 and an external power supply 3 are connected to the CPU 11A.

The switch 2 is always turned on when the internal combustion engine (not shown) is normal, but it is turned off momentarily when the engine becomes abnormal. Here, note that for instance, the switch 2 is turned off owing to abnormality resulting from wear on belts in the internal combustion engine.

In FIG. 5, the CPU 11A determines the state of the internal combustion engine from the state of the switch 2 (step S501), and stores one piece of recognized data corresponding to the result of the determination in a RAM (not shown) which is connected to the CPU 11A.

That is, if it is determined in step S501 that there is abnormality (that is, YES), the recognized data of "abnormality" is set to the RAM (step S502), whereas if determined as normal in step S501 (that is, NO), the recognized data of "normality" is set to the RAM (step S503).

Subsequently, the CPU 11A always monitors the voltage of the external power supply 3 (power supply voltage), and determines whether the power supply voltage is equal to or more than a prescribed value (step S504).

If it is determined in step S504 that the power supply voltage≧the prescribed value (that is, YES), the recognized data of "abnormality" stored in the RAM is stored in a prescribed position of the EEPROM 12 (step S505), whereas if determined as the power supply voltage<the prescribed value (that is, NO), the step S505 is skipped.

Here, note that the recognized data of "normality" is stored in the EEPROM 12 as an initial value.

Then, a determination is made as to whether the recognized data in the EEPROM 12 is "abnormality" (step S506). If the recognized data is "abnormality" (that is, YES), it is determined as "there being abnormality in the internal combustion engine" (step S507), whereas if determined as "normality" (that is, NO), it is determined as "the internal combustion engine being normal" (step S508), and the processing routine of FIG. 5 is ended.

Here, note that when processing (not shown) such as various kinds of MAP retrievals or the like necessary to control the internal combustion engine after the ending of the processing routine of FIG. 5, a return to step S501 is carried out and the monitoring of abnormality is continued.

The recognized data stored in the EEPROM 12 in step S505 is continuously kept stored without being lost even if the supply of power to the data holding device is stopped or cut off. Therefore, if the prescribed position in the EEPROM 12 is referred to when the supply of power is restarted, the CPU can know the state of the internal combustion engine before the re-starting of the power supply.

Accordingly, since the known data holding device 1A of the internal combustion engine determines an abnormal state of the internal combustion engine based on the recognized data stored in the EEPROM 12, as described above, the reliability of the recognized data in the EEPROM 12 becomes important. Thus, there arises the following problem. That is, the voltage of the external power supply 3 varies greatly and hence the defective writing of recognized data would be caused by such a variation in the power supply voltage, so an incorrect determination of "abnormality" might be made though the internal combustion engine is in fact normal, thus affecting other controls.

SUMMARY OF THE INVENTION

The present invention is intended to solve the problem as referred to above, and has for its object to provide a data holding device of an internal combustion engine which is capable of improving the reliability of recognized data stored in a data storage element (e.g., an EEPROM).

Bearing the above object in mind, the present invention resides in a data holding device of an internal combustion engine which includes a switch which is adapted to be turned on and off in accordance with a state of the internal combustion engine, a control element in the form of a CPU for determining the presence or absence of abnormality in the internal combustion engine based on a state of the switch, a data storage element in the form of an EEPROM for storing recognized data corresponding to the presence or absence of abnormality, an external power supply which supplies a power supply voltage to the control element, and a voltage holding circuit for holding the power supply voltage at a prescribed value for a period of time during which the recognized data is being stored into the data storage element. When abnormality is found in the internal combustion engine, the control element makes a plurality of pieces of recognized data indicative of abnormality stored into the data storage element, and at the same time the state of the internal combustion engine is determined based on groups of recognized data stored in the data storage element.

According to such a configuration, it is possible to prevent defective writing of data into the data storage element such as an EEPROM, which would otherwise be caused by a variation in the voltage of the external power supply, as a consequence of which erroneous or incorrect control due to defective data can be avoided.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings.

Embodiment 1

Figure 1:
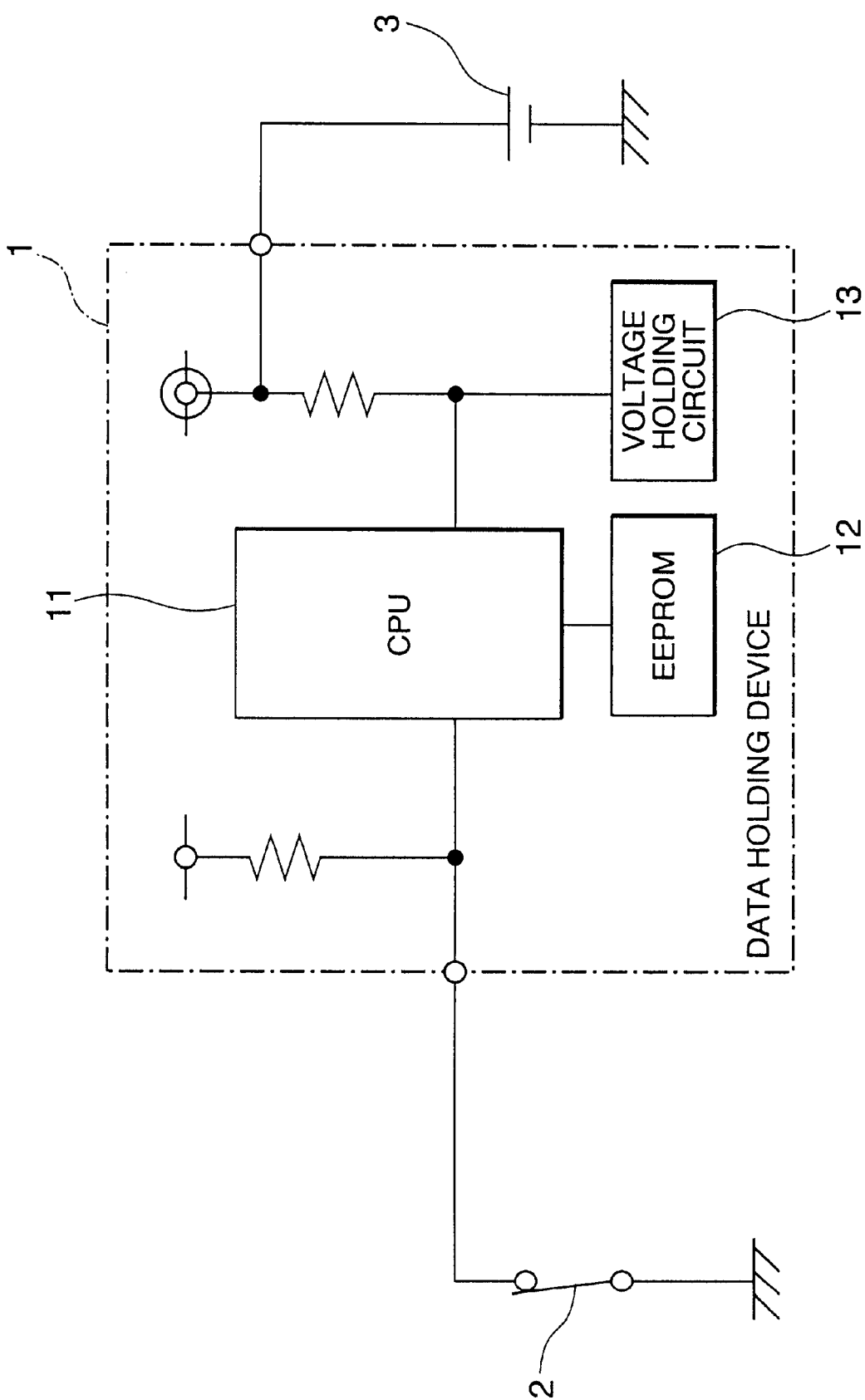
FIG. 1 is a block diagram showing a data holding device of an internal combustion engine according to a first embodiment of the present invention.
Figure 4:
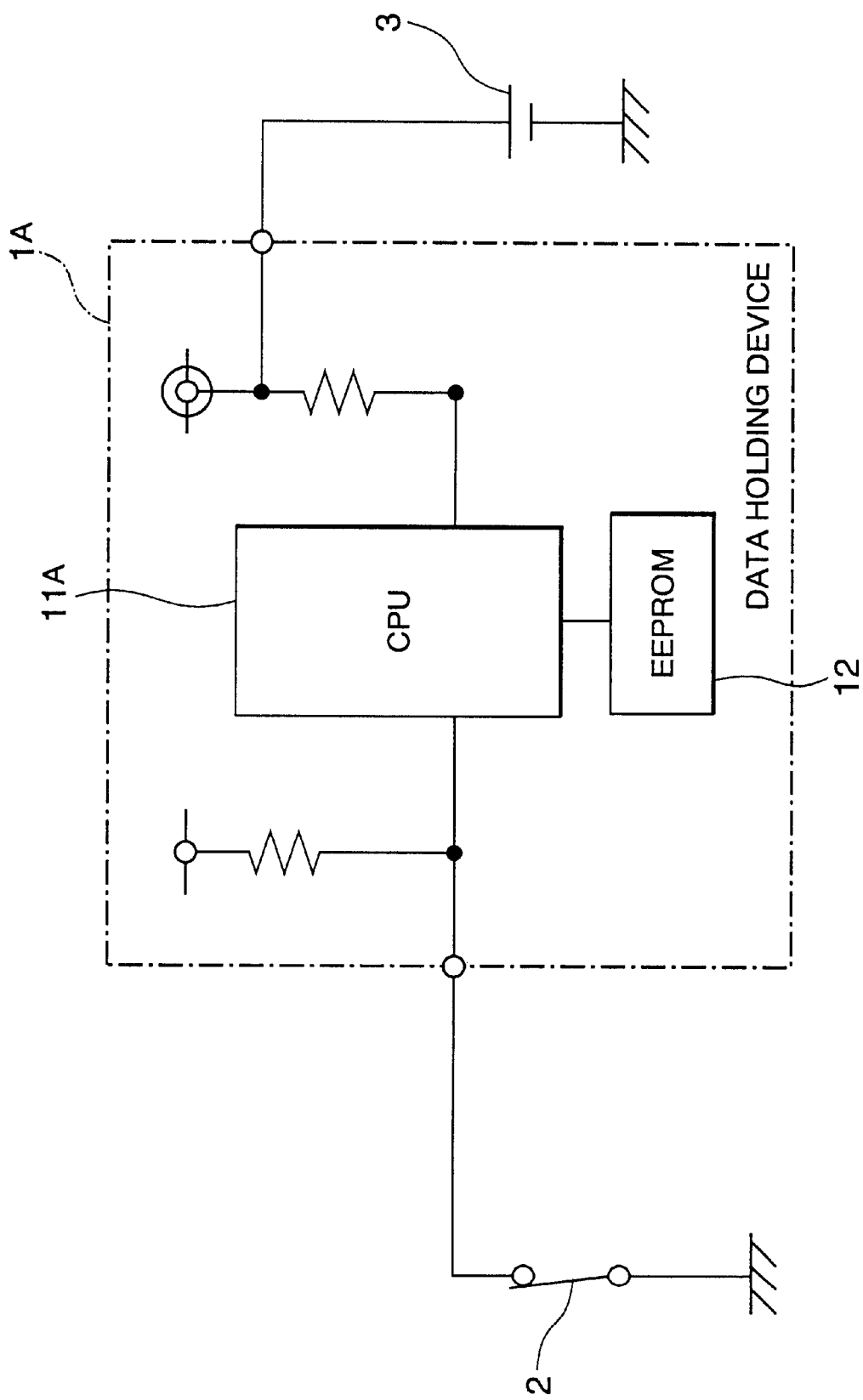
FIG. 4 is a block diagram showing a known data holding device of an internal combustion engine.

First, reference will be made to a data holding device of an internal combustion engine in accordance with a first embodiment of the present invention. FIG. 1 is a block diagram which shows the data holding device according to the first embodiment of the present invention. In this figure, the same or corresponding parts as those referred to above (see FIG. 4) are identified by the same symbols while omitting a detailed description thereof. In addition, the data holding device 1 and a CPU 11 correspond to the above-mentioned data holding device 1A and CPU 11A, respectively.

In FIG. 1, the data holding device 1 is provided with a control means in the form of the CPU 11, a data storage means in the form of an EEPROM 12, and a voltage holding means in the form of a voltage holding circuit 13. Additionally, a switch 2 and an external power supply 3 are connected to the CPU 11.

The CPU 11 stores recognized data in the EEPROM 12, and determines the state of an internal combustion engine (not shown) based on groups of recognized data stored in the EEPROM 12.

Next, reference will be made to the operation of the first embodiment of the present invention while referring to the flow chart of FIG. 2 together with FIG. 1.

Figure 2:
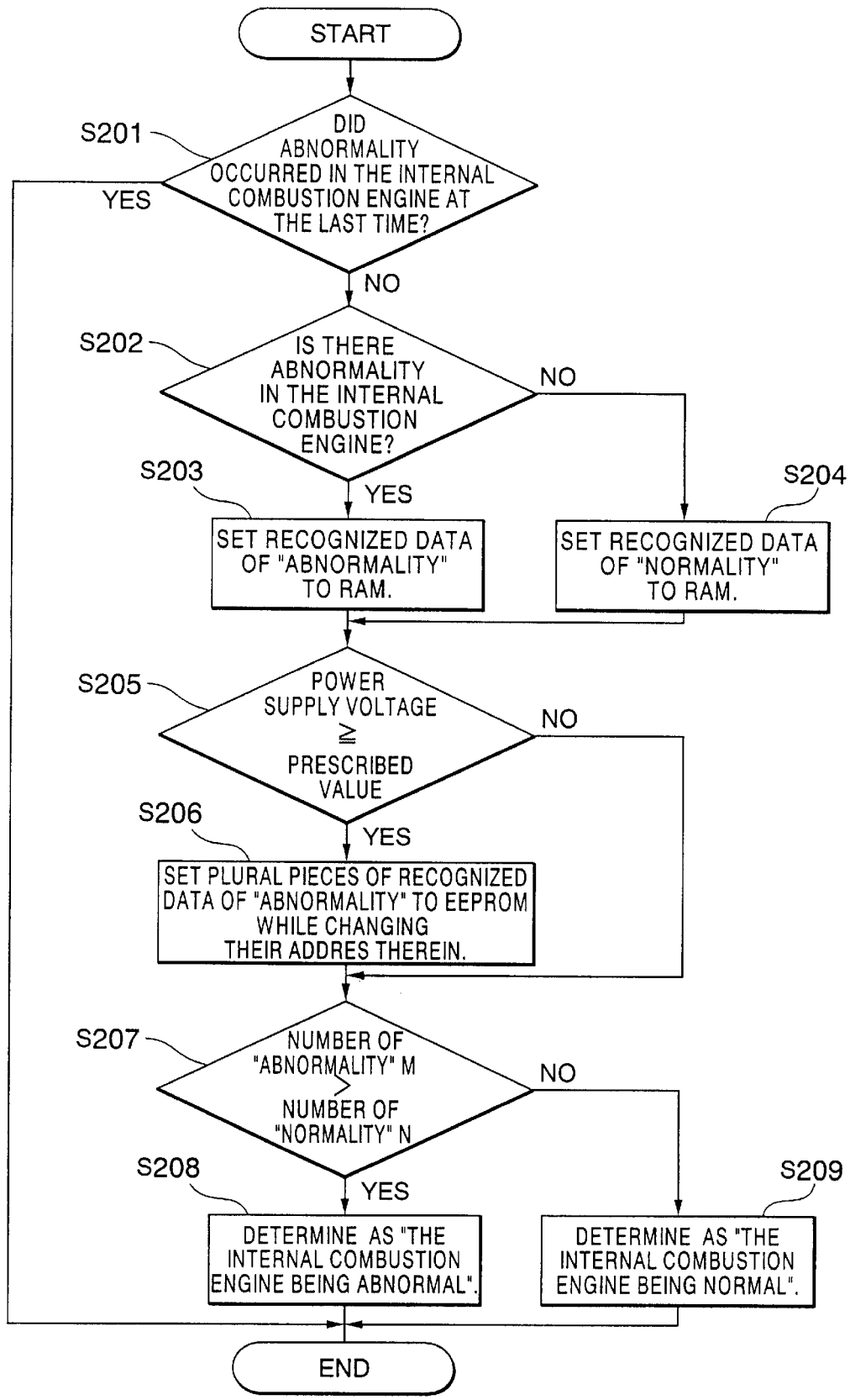
FIG. 2 is a flow chart showing the processing operation of the data holding device of an internal combustion engine according to the first embodiment of the present invention.
Figure 5:
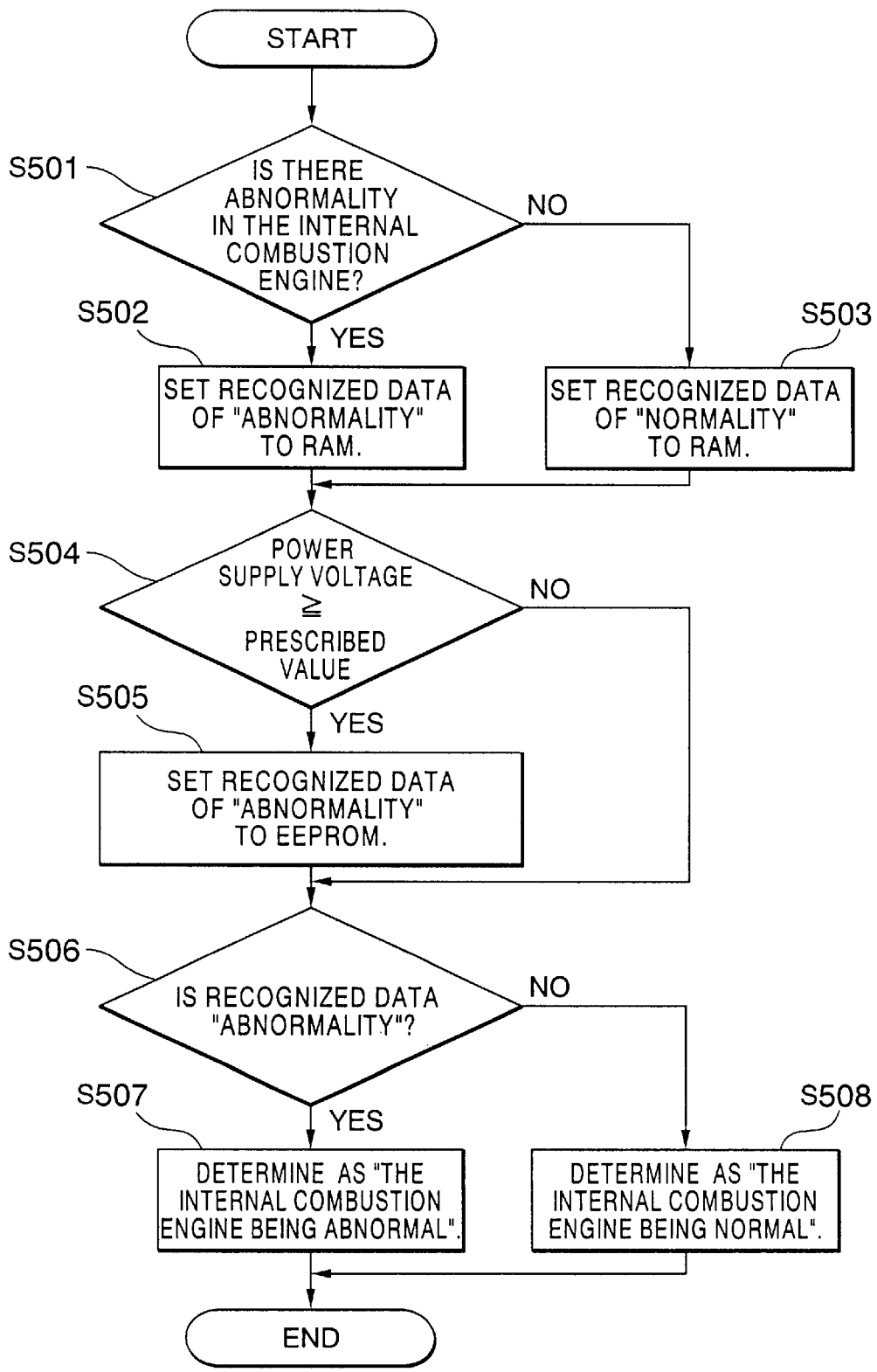
FIG. 5 is a flow chart showing the operation of the known data holding device of an internal combustion engine.

In FIG. 2, steps S202–S206, S208 and S209 are the same processes as those of the above-mentioned steps S501–S505, S507 and S508 (see FIG. 5), and step S207 corresponds to the above-mentioned step S506.

By referring to the EEPROM 12, the CPU 11 in the data holding device 1 determines whether abnormality occurred in the internal combustion engine at the last abnormality determination (step S201).

If it is determined in step S201 that there was abnormality in the internal combustion engine (that is, YES), a return to the step S201 is performed while skipping the steps S202–S209. On the other hand, if it is determined that the internal combustion engine is normal (that is, NO), the "ON" or "OFF" state of the switch 2 is always monitored so as determine whether abnormality has occurred in the internal combustion engine (step S202), while making use of the fact that the switch 2 is always in the state of "ON" when the internal combustion engine is normal, but it is turned off momentarily when the internal combustion engine is abnormal.

If it is determined in step S202 that there is abnormality in the internal combustion engine (that is, YES), the CPU 11 stores a piece of recognized data indicative of "abnormality" in a RAM (not shown) (step S203). If, however, it is determined that the internal combustion engine is normal (that is, NO), a piece of recognized data indicative of "normality" is stored in the RAM (step S204).

The recognized data can be stored in the RAM, for example, by defining that an "FF" in one byte is taken in the case of "normality" and when an "AA" in one byte is taken in the case of "abnormality".

Moreover, in step S203, a plurality of pieces of recognized data indicative of "abnormality" are stored in the RAM. For instance, if the switch 2 is turned off momentarily, three pieces of recognized data of "AA" indicative of "abnormality" are stored in the RAM.

Subsequently, the CPU 11 determines whether the power supply voltage of the external power supply 3 is equal to or higher than a prescribed value (step S205). If it is determined as the power supply voltage $\geq$ the prescribed value (that is, YES), all of the plurality of recognized data indicative of "abnormality" stored in the RAM are stored in the EEPROM 12 (step S206).

Here, note that a plurality of pieces of recognized data are respectively stored in the EEPROM 12 while changing their addresses for each piece of recognized data. That is, one address is assigned to each piece of recognized data (for instance, "AA" in one byte). A piece of recognized data (for instance, "FF") indicative of "normality" is stored in each prescribed position of the data storage area of the EEPROM 12 as an initial value.

In addition, in order to prevent an influence on the data holding device 1 due to a variation in the voltage of the external power supply 3, the voltage holding circuit 13 holds the internal voltage of the data holding device 1 at a prescribed voltage value for a minimum period of time necessary for writing data during the time when the recognized data is being written into the EEPROM 12.

On the other hand, if it is determined in step S205 as the power supply voltage<the prescribed value (that is, NO), the writing of data into the EEPROM 12 is not performed.

Subsequently, the CPU 11 counts the number of "normality" data N and the number of "abnormality" data M, respectively, by referring to the groups of recognized data stored in the data storage element in the form of the EEPROM 12, and makes a determination as to whether the relation of M>N is satisfied (step S207).

If it is determined in step S207 as M>N (that is, YES), the CPU 11 determines that there is abnormality in the internal combustion engine (step S208). On the other hand, if it is determined as M$\leq$N (that is, NO), the internal combustion engine is determined to be normal (step S209), and the processing routine of FIG. 2 is ended.

Here, note that when processing (not shown) such as various MAP retrievals or the like necessary to control the internal combustion engine after the ending of the processing routine of FIG. 2 has been performed, the step S201 is returned to and abnormality monitoring is continued.

Thus, because the state of the internal combustion engine is determined based on the results of comparison between the number of "abnormality" data and the number of "normality" data by using a plurality of recognized data, reliability in the results of determination is enhanced as compared with the case where such a determination is made by using only one piece of recognized data.

Furthermore, during the time when recognized data is being written into the EEPROM 12, the voltage holding circuit 13 serves to hold the internal voltage of the data holding device 1 at the prescribed voltage value for a minimum period of time necessary for writing the data, whereby it is possible to write the recognized data into the EEPROM 12 in a reliable manner.

Embodiment 2

Although in the above-mentioned first embodiment, all the pieces of recognized data are written into the EEPROM 12 in one writing operation in the process of writing a group of recognized data (step S206), only one piece of recognized data may be written in one writing operation, and such a writing operation may be carried out repeatedly.

Here, note that the configuration of a data holding device in this case is the same as shown in FIG. 1, and differs only in a part of the function of the CPU 11 from the above-mentioned first embodiment.

Figure 3:
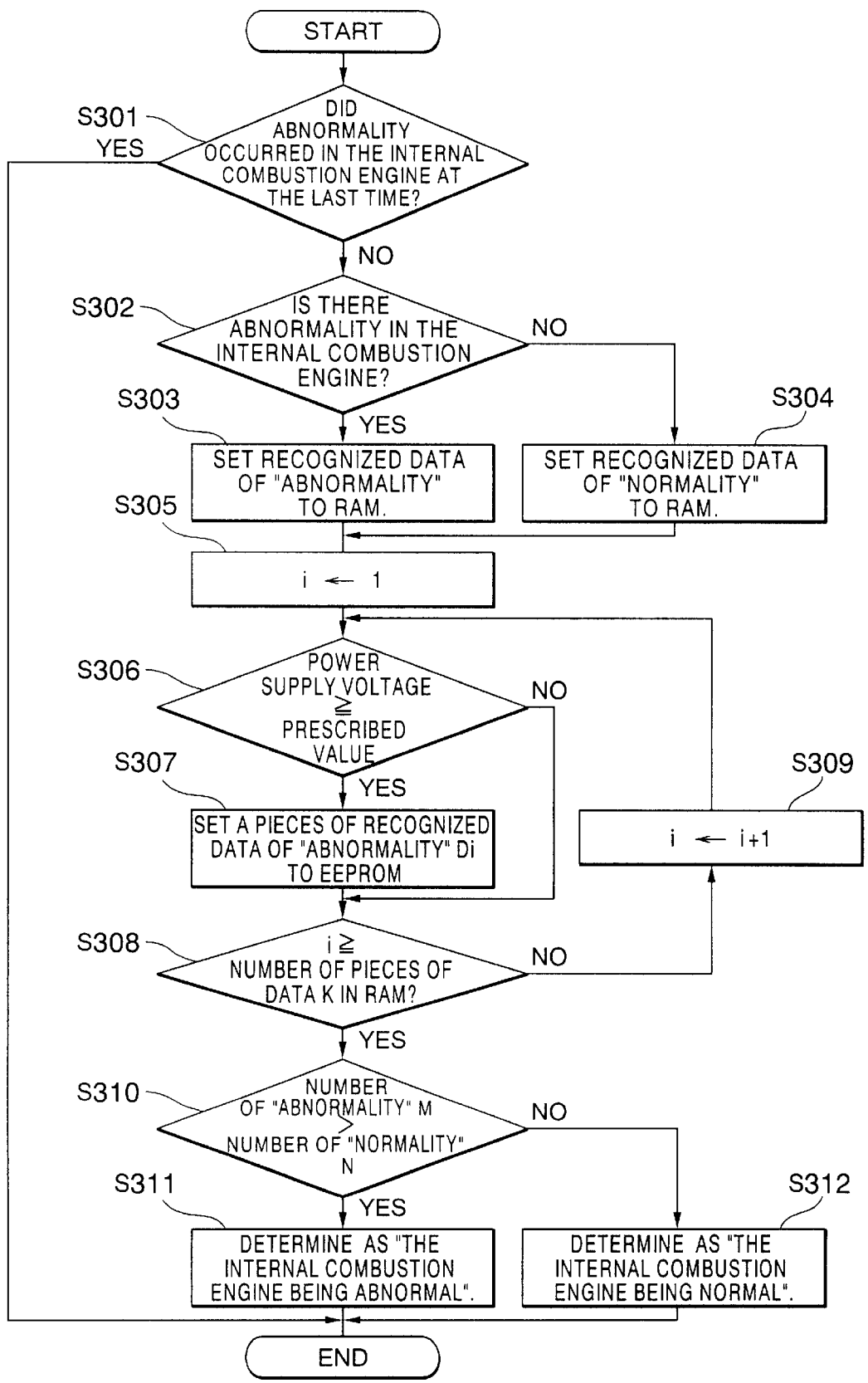
FIG. 3 is a flow chart showing the processing operation of a data holding device of an internal combustion engine according to a second embodiment of the present invention.

FIG. 3 is a flow chart which shows the operation of a second embodiment of the present invention. In this figure, steps S301–S304, S306, and S310–S312 correspond to the steps S201–S204, S205, and S207–S209, respectively, of the above-mentioned first embodiment (see FIG. 2).

Hereinafter, reference will be made to the operation of the second embodiment of the present invention while referring to FIG. 3 together with FIG. 1.

In FIG. 3, by referring to the EEPROM 12, the CPU 11 in the data holding device 1 determines whether abnormality occurred in the internal combustion engine at the last abnormality determination (step S301).

If it is determined in step S301 that the internal combustion engine was abnormal (that is, YES), a return to step S301 is performed while skipping steps S302–S312, whereas if it is determined that the internal combustion engine was normal (that is, NO), a determination is made based on the "ON" or "OFF" state of the switch 2 as to whether there is abnormality in the internal combustion engine (step S302). If it is determined that there is abnormality in the internal combustion engine (that is, YES), recognized data indicative of "abnormality" is stored in a RAM (not shown) (step S303). If, however, it is determined that the internal combustion engine is normal (that is, NO), recognized data indicative of "normality" is stored in the RAM (step S304).

In addition, in step S303, a plurality of pieces of recognized data indicative of "abnormality" is stored in the RAM. For instance, if the switch 2 is turned off momentarily, three pieces of recognized data of "AA" indicative of abnormality are stored in the RAM.

Subsequently, "1" is set to a counter i for counting the number of recognized data (step S305), and it is checked whether the power supply voltage of the external power supply 3 is equal to or higher than a prescribed value (step S306).

If it is determined in step S306 as the power supply voltage≧the prescribed value (that is, YES), the i-th piece of recognized data Di among the data indicating "abnormality" stored in the RAM is stored into the EEPROM 12 (step S307).

In this case, too, upon storing the data into the EEPROM 12, respective pieces of recognized data are stored with their addresses being changed respectively. Here, note that a piece of recognized data (for instance, "FF") indicative of "normality" as an initial value is stored in each prescribed position of the data storage area of the EEPROM 12.

Moreover, in order to prevent an influence on the data holding device 1 due to a voltage variation in the external power supply 3, the voltage holding circuit 13 holds the internal voltage of the data holding device 1 at a prescribed voltage value for a minimum period of time necessary for writing data during the time when the recognized data is being written into the EEPROM 12.

In addition, if it is determined in step S306 as the power supply voltage<the prescribed value (that is, NO), the writing of data into the EEPROM 12 is not performed.

Then, a comparison is made between the counted number of the counter i and the number of pieces of recognized data K indicative of "abnormality" stored in the RAM, so as to determine whether a condition of i≧K is satisfied (step S308).

If it is determined in step S308 as i<K (that is, NO), the counted value of the counter i is incremented by "1" (step S309), and a return to step S306 is carried out. Thereafter, the process of writing data into the EEPROM 12 (step S307) is repeated until the counted value of the counter i reaches the number of pieces of recognized data K.

On the other hand, if it is determined in step S308 as i≧K (that is, YES), the process of writing a group of recognized data into the EEPROM 12 (step S307) is ended.

Subsequently, the CPU 11 counts the number of "normality" data N and the number of "abnormality" data M by referring to the groups of recognized data stored in the EEPROM 12, as described above with reference to the first embodiment, and makes a determination as to whether M>N (step S310).

If it is determined in step S310 as M>N (that is, YES), a determination is made that there is abnormality in the internal combustion engine (step S311), whereas if determined as M≦N (that is, NO), the internal combustion engine is determined to be normal (step S312), and the processing routine of FIG. 3 is ended.

Incidentally, note that when processing (not shown) such as various MAP retrievals or the like necessary to control the internal combustion engine has been carried out after the ending of the processing routine of FIG. 3, the step S301 is returned to and abnormality monitoring is continued.

In this manner, the CPU 11 writes the respective pieces of recognized data into the EEPROM 12 one by one while checking the power supply voltage in each writing operation of one piece of recognized data. As a result, it is possible to shorten the operating time of the voltage holding circuit 13.

In general, the circuit scale of the voltage holding circuit 13 increases in proportion to its increasing voltage holding time (i.e., the increasing operating time of the voltage holding circuit 13), thus resulting in an increase in the cost. According to this embodiment, however, the circuit scale of the voltage holding circuit 13 can be suppressed or reduced by shortening the operating time thereof, thus making it possible to achieve a substantial reduction in the total costs.

As described above, according to the present invention, there are obtained the following excellent advantages.

A data holding device of an internal combustion engine according to the present invention includes a switch which is adapted to be turned on and off in accordance with a state of the internal combustion engine, control means for determining the presence or absence of abnormality in the internal combustion engine based on a state of the switch, data storage means for storing recognized data corresponding to the presence or absence of abnormality, and storing a piece of recognized data indicative of the absence of abnormality as an initial value thereof, an external power supply which supplies a power supply voltage to the control means, and voltage holding means for holding the power supply voltage at a prescribed value for a period of time during which the recognized data is being stored into the data storage means. When abnormality is found in the internal combustion engine, the control means makes a plurality of pieces of recognized data indicative of abnormality stored into prescribed addresses of the data storage element, respectively, and at the same time the state of the internal combustion engine is determined based on groups of recognized data stored in the data storage element. With this configuration, it is possible to prevent defective writing of data into the data storage means such as an EEPROM, which would otherwise be caused by a variation in the voltage of the external power supply, thus avoiding erroneous or incorrect control due to defective data.

Moreover, in a preferred form of the invention, the control means determines the content of a piece of recognized data, which is the greatest in number among the recognized data groups, as the state of the internal combustion engine. Thus, it is possible to obtain the results of determination with higher reliability than in the case of using one piece of recognized data, as a consequence of which erroneous or incorrect control due to defective data can be prevented.

In addition, in another preferred form of the invention, when the power supply voltage is equal to or higher than a prescribed value, the control means makes the piece of recognized data indicative of the presence of abnormality stored into the data storage means, whereas when the power supply voltage is lower than the prescribed value, the control means skips the piece of recognized data indicative of the presence of abnormality. Accordingly, the time required for one writing operation can be shortened, thus making it possible to reduce the operating time of the voltage holding means in the form of a voltage holding circuit. As a result, the voltage holding circuit can be made compact.

While the invention has been described in terms of preferred embodiments, those skilled in the art will recognize that the invention can be practiced with modifications within the spirit and scope of the appended claims.

What is claimed is:

1. A data holding device of an internal combustion engine comprising:

a switch which is adapted to be turned on and off in accordance with a state of said internal combustion engine;

control means for determining the presence or absence of abnormality in said internal combustion engine based on a state of said switch;

data storage means for storing recognized data corresponding to the presence or absence of abnormality, and storing a piece of recognized data indicative of the absence of abnormality as an initial value thereof;

an external power supply which supplies a power supply voltage to said control means; and voltage holding means for holding the power supply voltage at a prescribed value for a period of time during which said recognized data is being stored into said data storage means;

wherein when abnormality is found in said internal combustion engine, said control means makes a plurality of pieces of recognized data indicative of abnormality stored into prescribed addresses of said data storage means, respectively, and at the same time the state of said internal combustion engine is determined based on groups of recognized data stored in said data storage means.

2. The data holding device of an internal combustion engine according to claim 1, wherein said control means determines the content of a piece of recognized data, which is the greatest in number among said recognized data groups, as the state of said internal combustion engine.

3. The data holding device of an internal combustion engine according to claim 1, wherein when said power supply voltage is equal to or higher than a prescribed value, said control means makes said piece of recognized data indicative of the presence of abnormality stored into said data storage means, whereas when said power supply voltage is lower than said prescribed value, said control means skips said piece of recognized data indicative of the presence of abnormality.

* * * * *